United States Patent

Jacobs et al.

Patent Number: 5,970,697
Date of Patent: Oct. 26, 1999

[54] LINE WITH DOUBLE SPLICED LOOPS

[76] Inventors: William J. B. Jacobs; Tanya S. Jacobs; Mark W. Jacobs, all of P.O. Box 429, Sylvester, W. Va. 25193

[21] Appl. No.: 08/921,259

[22] Filed: Aug. 29, 1997

Related U.S. Application Data

[63] Continuation-in-part of application No. 08/845,361, Apr. 24, 1997, Pat. No. 5,871,193.

[51] Int. Cl.$^6$ .................................................. D01H 17/00
[52] U.S. Cl. ........................ 57/22; 57/25; 57/26; 57/202; 87/13; 289/1.5
[58] Field of Search ................................. 57/202, 22, 25, 57/26; 87/8, 13; 289/1.2, 1.5, 18.1

[56] References Cited

U.S. PATENT DOCUMENTS

| | | |
|---|---|---|
| 330,087 | 11/1885 | Binns . |
| 2,600,395 | 6/1952 | Domoj et al. ................................. 87/13 |
| 4,962,929 | 10/1990 | Melton, Jr. ............................. 273/29 R |
| 5,062,344 | 11/1991 | Gerker ........................................... 87/8 |
| 5,540,703 | 7/1996 | Barker, Jr. et al. ...................... 606/139 |

*Primary Examiner*—William Stryjewski
*Attorney, Agent, or Firm*—Richard C. Litman

[57] ABSTRACT

A rope or line having a permanent loop of fixed diameter spliced in each end thereof provides for the suspension of innumerable articles in various industries, but is particularly well suited for use in underground mining, where it may be used to support continuous miner machine cables, electric, pneumatic, and hydraulic lines, air ventilation ducts, etc., above the floor of the mine drift. The line is preferably formed of a braided synthetic fiber which has been treated to provide flame retardant properties and which is also electrically non-conductive. Treated, braided polypropylene is a suitable material for the present double looped line. The closed loops are formed by passing the first end of the line diametrically through its opposite portion, and then coaxially through that same portion and diametrically through the portion captured within the hollow braided core to secure the first end therein and to form a closed loop. The second end portion of the line is worked in an identical manner to form an essentially identical second loop. This construction results in a braided line in which the spliced portions are pulled more tightly and securely together when tension is applied to the two opposite loops, thus producing more secure loops which cannot slip when tension is applied. The double looped line may also be provided with bright, contrasting colors for better visibility in areas of low light, as in the mining environment.

10 Claims, 4 Drawing Sheets

LINE WITH DOUBLE SPLICED LOOPS

REFERENCE TO RELATED PATENT APPLICATION

This application is a continuation in part of application Ser. No. 08/845,361 filed on Apr. 24, 1997, now U.S. Pat. No. 5,871,193.

BACKGROUND OF THE INVENTION

1. Field of the Invention

The present invention relates generally to article supports, hooks, loops, and etc., and more particularly to a hollow braided line formed of a length of preferably flame resistant and electrically non-conductive flexible material. The line includes a spliced loop formed at each end thereof, and is used to support and suspend articles such as electrical cables, pneumatic and hydraulic lines, ventilation ducts, etc. in the mining industry, and has further applications in many other industries such as suspending parts being painted from an overhead conveyor system, as well as other applications where good strength and resistance to flame and industrial chemicals is required.

2. Description of the Related Art

Many industries require some means of temporarily supporting or suspending various articles for various purposes, and often have need of a simple yet durable strap or loop which may be used as a hanger for various parts and components. Accordingly, various such devices have been developed in the past, but all have had one or more deficiencies which have rendered them unsuitable for use in demanding industries such as underground mining, where flame resistance, electrical non-conductivity, resistance to chemicals, and good strength, durability, and reliability are absolutely required.

In the past, the various devices manufactured for such purposes have not included all of the above properties, and moreover were not necessarily formed of highly visible materials providing for ease of visibility in darkened areas such as mines and the like. Moreover, such hanger loops, when formed of twisted or braided rope material, were often closed using means which were prone to slippage or damage, thus allowing the loop to open and release any articles being supported thereby. The present hollow braided line with double spliced loops responds to each of the above problems and deficiencies by using a suitable material, and forming a closed loop at each end of the line using that material, which loops are completely resistant to opening when strain is placed upon the line and its loops. A discussion of the related art of which the inventors are aware, and its differences and distinctions from the present invention, is provided below.

U.S. Pat. No. 330,087 issued on Nov. 10, 1885 to Leedham Binns describes an Endless Band Or Cord, comprising a single loop of hollow braided rope or the like which has been formed by inserting each of the opposite ends into the hollow braid opposite one another. The ends which are worked into the body of the rope or line are not interlocked with one another, and while Binns states that they cannot slip, experience has shown that such interwoven (but not interlocked) ends can slip, particularly in lines formed of synthetic materials having relatively low coefficients of friction. Moreover, Binns teaches away from the present double looped line, as he requires that both ends be used to form a single loop. The present invention requires that only a single end be interwoven with the standing portion of the line, thus allowing a loop to be formed at each end of a length of line.

U.S. Pat. No. 2,600,395 issued on Jun. 17, 1952 to John J. Domoj et al. describes a Keyhole Splice wherein the free end of the braided line is worked back through the standing end several times, by penetrating the standing end with a fid. The passages through the standing end are radially offset, so the free end weave through the standing end results in a spiral pattern. The free end does not pass back into the standing end to penetrate back through itself within the standing end, and to be captured within the standing end, as in the loops of the present double loop invention. Rather, the free end terminates outside the standing portion of the line, where it is subject to being snagged or caught on another object.

U.S. Pat. No. 4,962,929 issued on Oct. 16, 1990 to Eugene R. Melton, Jr. describes a Wrist Strap For Attracting An Item Of Sports Equipment To The Wrist. The Melton, Jr. strap is formed from a length of hollow braided line, with one end being inserted back into the hollow core of the free end or length to form a loop. This free end is then passed through the loop, which is left at least somewhat loose to form a configuration somewhat like a slip knot. In contrast, each loop of the present line with double spliced loops is formed by first passing one end of the line diametrically through the opposite portion, and then back through itself within and along the hollow core of the free portion of the line. The result is a loop which cannot slip, nor is any slippage desirable in the present line loops.

U.S. Pat. No. 5,062,344 issued on Nov. 5, 1991 to Thomas F. Gerker describes a Bowline Knot In A Braided Line, wherein a special hook is used to draw a doubled free end of the line back into and through the hollow core. The end remains captured within the core to form a doubled loop, but the two loops meet at the point where the free end enters the hollow core; the Gerker construction cannot provide a substantial length of line between the two loops, as in the present invention. Also, the free end of the line is passed through one of the loops, with the loop being pulled taut around the base of the free end. The captured end of the line is not positively secured within the core of the line, and can pull out, releasing the arrangement, unlike the present double looped line invention.

Finally, U.S. Pat. No. 5,540,703 issued on Jul. 30, 1996 to Boyd T. Barker, Jr. et al. describes a Knotted Cable Attachment Apparatus Formed Of Braided Polymeric Fibers. A small loop or eye is formed in a portion of the cable by passing the working end through the standing length, as in the first step in forming the loop configuration of the present invention. However, the working end is then passed back through the standing length of the line, rather than back into the working end portion within the hollow core, as in the present method. Thus, the size of the Barker, Jr. et al. eye formed may be adjusted by pulling on the working end, as it is not locked within the core of the line by the working end passing back through itself within the core so it cannot escape laterally through the sides of the core, as in the present configuration. Moreover, Barker, Jr. et al. teach away from the present invention wherein a separate loop of fixed size is formed in each of the two opposed ends of the line. Barker, Jr. et al. form the second loop in a different manner from the first loop or eye, similarly to the method used in forming the splice of the Domoj et al. patent, whereas the two loops of the present double looped line are identical to one another. Also, the second loop of the Barker, Jr. et al. cable is constructed to pass through the first eye or loop, whereas the two loops of the present invention are completely separate, and are separated by a length of line therebetween.

None of the above inventions and patents, either singly or in combination, is seen to describe the instant invention as claimed.

SUMMARY OF THE INVENTION

The present invention comprises a length of rope or other flexible stranded material, having a closed loop spliced at each end thereof. The line may be used as a hanger for various articles in a variety of different industries, such as in supporting cables for continuous miner machinery used in the coal mining industry, as well as in other environments. Each loop is formed by passing the first end of the rope diametrically through its standing end portion, then coaxially through that same portion and diametrically through the portion within the standing end portion of the line, to lock the position of the line as it passes through itself, and thus fix the diameter of the loop. The opposite end of the line is formed in an identical manner. This construction results in a braided rope with a pair of loops in which the interconnected portions are pulled more tightly and securely together when tension is applied to the opposite loops, thus producing more secure loops which cannot slip when tension is applied.

The present hanger is particularly well suited for use in underground mining for the suspension or tying off of electrical cables, pneumatic and hydraulic lines, ventilation ducts, etc. from the roof or along the walls of a drift, in order to support them well above the floor. However, the versatility of the present hanger provides a broad range of uses, such as the suspension of articles from an overhead conveyor for painting or other processing, support of ancillary equipment such as fire extinguishers and the like, safety lines, etc.

The material of which the present hanger is formed is preferably an electrically non-conductive and flame resistant synthetic fiber, with a flame retardant treated braided polypropylene being preferred. The polypropylene rope is preferably a bright color, such as yellow, in order to stand out visually in darkened environments. At least one strand of the multiple stranded braided rope may be of a contrasting color, such as a bright orange, for further visual distinction.

Accordingly, it is a principal object of the invention to provide an improved hanger which is formed as a line having a closed loop formed at each end thereof by knotting, looping, and interweaving each end of the rope to form a closed loop at each end which is incapable of slipping when tension is applied thereto.

It is another object of the invention to provide an improved hanger line which is preferably formed of braided synthetic fibers of electrically non-conductive and flame resistant material, such as a braided polypropylene rope or line which has been treated to have a flame resistant property.

It is a further object of the invention to provide an improved hanger loop which is highly visible and which is formed of a bright color, and which may also include at least one strand of a contrasting bright color as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
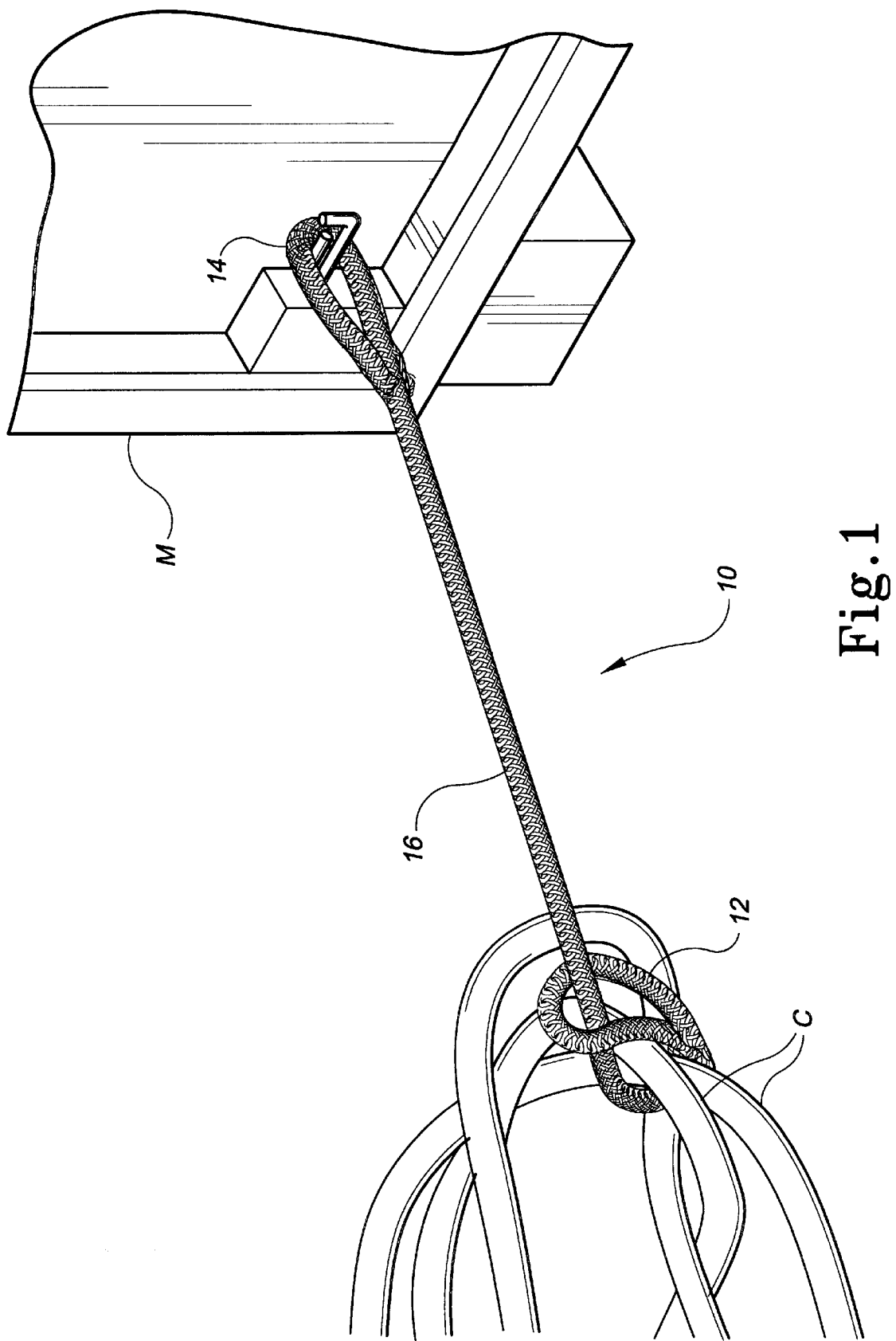
FIG. 1 is an environmental perspective view of a double loop line of the present invention being used to support or tie off a plurality of cables or the like, relative to another article.

The present invention comprises a rope or line 10 having integral first and second closed loops 12 and 14 spliced therein at each end thereof, with an intermediate length 16 extending therebetween, for use in tying off or suspending various articles. An example of the present line 10 and its function is shown in FIG. 1. The line 10 is well suited for use in the underground mining industry for tying off cables C from continuous miner machinery M as shown in FIG. 1, or for supporting or suspending articles such as electrical cables, hydraulic and pneumatic lines, ventilation ducts, etc. from the roof or along the wall of a mine drift to keep such articles clear of the drift floor. The lines 10 may be suspended by S-hooks (not shown) or other suitable article attachment means, or looped about another article and secured, e.g. by means of a girth hitch as shown around the cables C in FIG. 1.

The present line 10 may be formed to have virtually any practicable length and loop diameter, as desired. Preferably, the length of the line 10 between the two loops 12 and 14 is sufficient to position any articles secured thereby well away from the opposite the loop which may be connected to a metal object. This precludes any arcing of electrical energy between the article secured by the line 10, such as the cable C, and a grounded potential.

Figure 2:
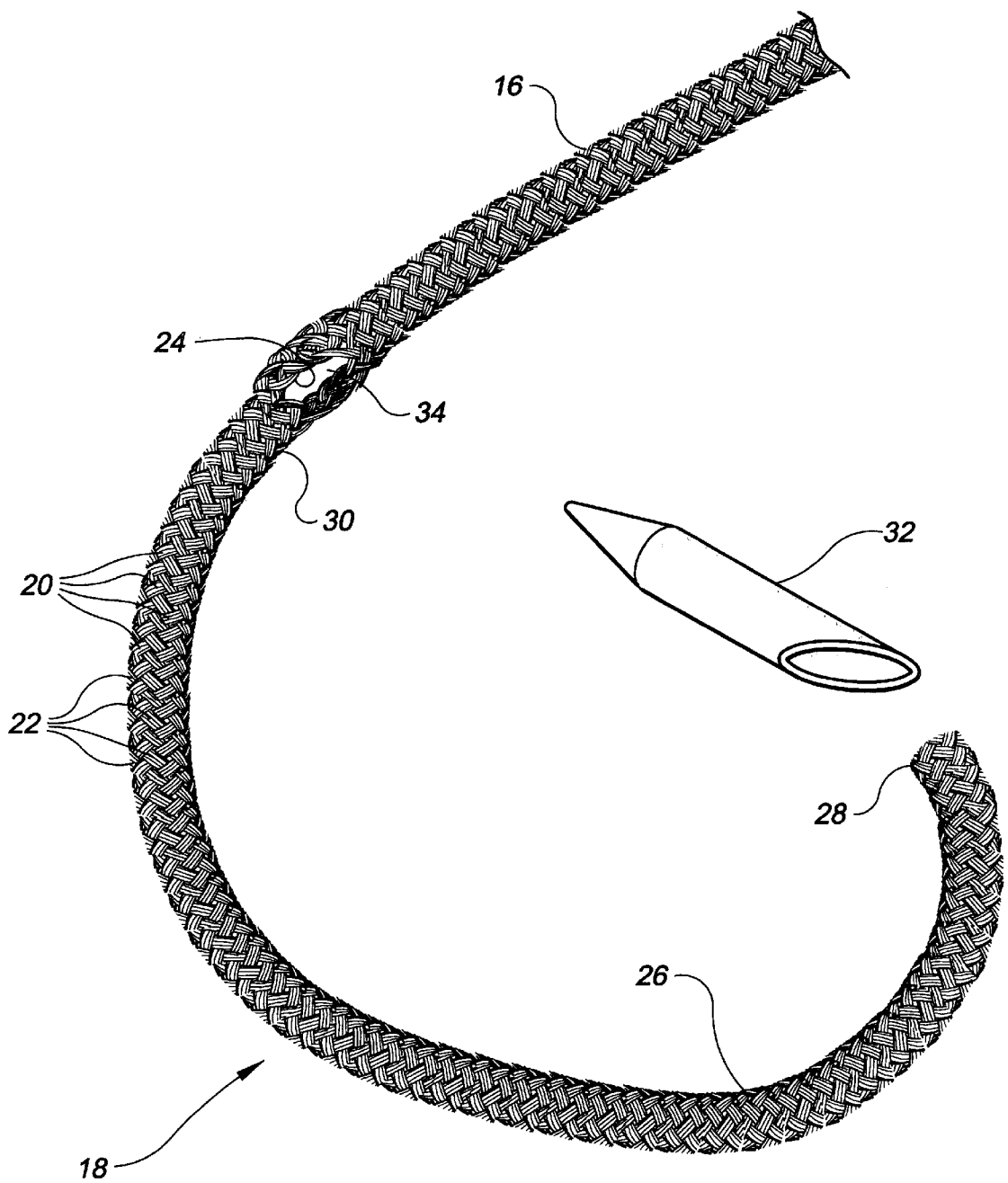
FIG. 2 is a perspective view of the first stage of the formation of one loop of the present double loop line.
Figure 3:
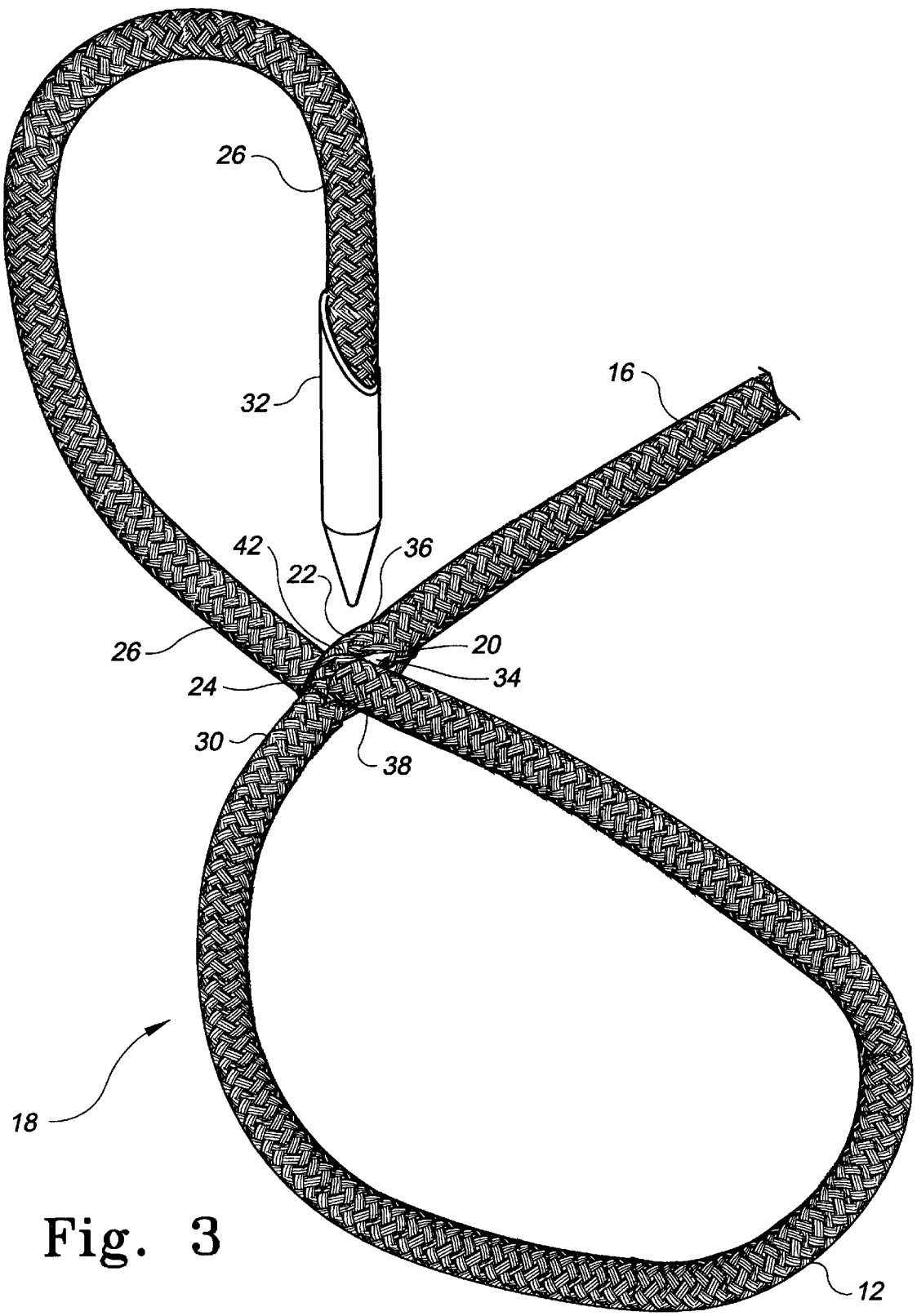
FIG. 3 is a perspective view of the second stage of the formation of the present double loop line.
Figure 4:
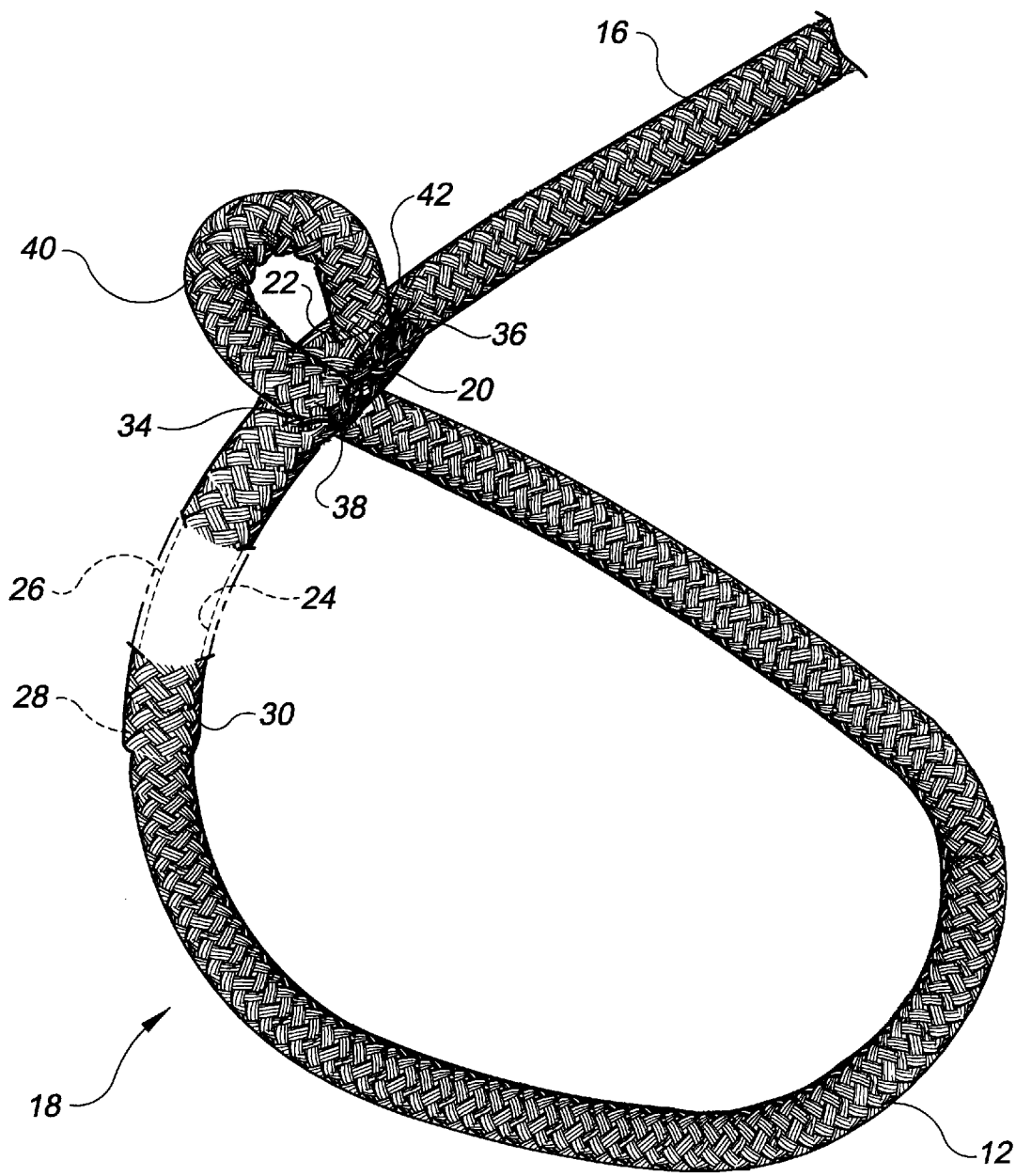
FIG. 4 is a perspective view of the completion of the second stage of formation shown in FIG. 3, completing the formation of one loop in one end of the rope or line.

The present line 10 is formed of a length of hollow core, braided fiber rope 18, an example of which is shown in FIGS. 2 through 4. (It should be understood that the length 18 shown in FIGS. 2 through 4 comprises only the first end portion of the total length of the present line 10, with the opposite second end portion used to form the second loop 14 of FIG. 1 being omitted from FIGS. 2 through 4 for clarity in the drawing figures.) Such braided hollow core rope is formed of a plurality of diagonally interwoven strands, with each of the strands being formed of a plurality of individual fibers. An equal number of first diagonal direction strands 20 and opposite second diagonal direction strands 22, are alternatingly interwoven over and under one another to provide a rope having a hollow core 24. The rope length 18 includes a first connecting portion 26 with a first end 28 extending therefrom, and a second connecting portion 30 extending from the first connecting portion 26 to the beginning of the intermediate length portion 16, which terminates in an opposite second rope end portion of essentially identical configuration to the end portion 18 shown in FIGS. 2 through 4. These connecting portions and ends, e. g., the first end 28 and corresponding first and second connecting portions 26 and 30, are worked through the respective diagonal strands of one another to produce the completed closed loops 14 and 14, e. g., the first loop 12.

Before forming the present line with double spliced loops 10, it should be understood that while the loops 12 and 14 may be disassembled for opening, the loops 12 and 14 normally remain permanently closed with their two connecting portions and ends, e.g. first and second portions 26 and 30 and first end 28 being permanently spliced together. While an openable article support, such as a D-ring (not shown), may be attached or removed from either of the closed loops 12 and/or 14 at any time, other types of supports having permanently closed loops, such as leaf spring hooks, snap hooks with spring loaded pins, etc., must be installed along the rope end portion(s) before the two connecting portions and end, e. g., portions 26 and 30 and end 28 are spliced together. One or more of the above devices, or other attachments, may be secured to either or both of the completed loops 12 and 14, as desired.

The first step in forming the present line and loops is shown in FIG. 2, where a fid (splicing tool) 32 is placed over the first end 28 of the rope length 18, and to use the point of the fid 32 to separate two adjacent first and second strands 20 and 22 and form an eye or passage diametrically completely through the second connecting portion 30 at a first point 34 of the rope length 18. The fid 32, with the rope first end 28 inserted therein and the first connecting portion 26 extending therefrom, is worked diametrically completely through the passage at the first point 34 through the second connecting portion 30 of the rope length 18, drawing the first end 28 and first connecting portion 26 of the rope length 18 through the eye at the first point 34. The amount of rope or line drawn through will depend upon the rope diameter and other factors, but will be on the order of five inches for quarter inch diameter rope, to perhaps a foot or so for rope or line diameters on the order of an inch or so.

The above described step will be similar to the rope length 18 of FIG. 3, when completed. The fid 32, with the first connecting portion 26 extending therefrom, is then doubled back to the second connecting portion 30 of the rope length 18, and the point of the fid 32 used to separate adjacent first and second strands 20 and 22 to form a second eye or point 36 in the second connecting portion 30 of the rope length 18. The fid 32 point is then inserted through the second eye 36, diametrically through the intersecting portion 38 of the first connecting portion 26 within the hollow core 24 of the second connecting portion 30, and then worked concentrically through the hollow core 24 of the second connecting portion 30 to conceal the first end 28 within the hollow core 24 of the second connecting portion 30, as shown completed in FIG. 4.

The first connecting portion 26 adjacent the fid 32 is then held within the hollow core 24 and the fid 32 is worked out of the hollow core 24, between adjacent strands 20 and 22, and removed from the first end 28 of the rope 14. The first end 28, with the immediately adjacent portion (i. e., a few to several inches) of the first connecting portion 26, is thus concealed and secured within the hollow core 24 of the remainder of the second connecting portion 30, as shown in FIG. 4. A small loop, eye, or knot 40 will remain extended from the surface of the second connecting portion 26 of the rope length 18 at the connection between the intermediate portion 16 and the finished loop 12, as described further below, which may be worked and shortened as desired to form a small nub along the rope surface, as shown in the completed line 10 with its two finished loops 12 and 14 in FIG. 1.

The first and second points of penetration 34 and 36 of the second connecting portion 30, are not precisely at the same point. However, they are very closely adjacent to one another, preferably being separated by only a single first strand 20 and second strand 22, where the first strand 20 crosses the second strand 22 to form an "X" configuration 42 of the two strands 20 and 22 between the two penetration points 34 and 36 of the second connecting portion 30. Thus, as the small loop or eye 40 formed in the first connecting portion 26 by its diametric passage through and then concentric passage into the second connecting portion 30, is pulled taut, it is precluded from slipping completely into the hollow interior 24 of the rope length 18 due to its external passage about the crossed strands 20 and 22 at the "X" point 42 between the two penetration points 34 and 36 of the second connecting portion 30. The configuration of the single completed loop 12 of the rope length 10 is shown in FIG. 4, and again it should be noted that the loop 14 formed at the opposite end of the intermediate length 16 is constructed essentially identically to the loop 12, using essentially the procedure and steps described above.

The above described line and double loop 10 construction provides a significant increase in strength over other such lines and loops of the related art, in that the novel weaving of each end, e.g. the first end 28, diametrically through the corresponding second connecting portion, e.g., connecting portion 30 at a first point 34, and thence back into the second connecting portion 30 at a separate second point 36 and back to pass through itself within the second connecting portion 30, provides a locking interweave of strands 42 about which the first connecting portion knot or eye 40 is formed, which preclude the pulling of the first connecting portion 26 from the second connecting portion 30 into which it has been concentrically worked.

With other loops in which the two opposite ends have been interwoven into their opposite hollow rope members, continual tension, particularly if variable as loads are increased and reduced, can cause the two ends to work loose from their opposite rope portions in which they are captured, as they pass more or less straight into one another and do not form a capture loop about a crossed pair of strands, as provided in the loops of the present line 10. Thus, the greater the tensile force applied to the present line 10 through its two loops 12 and 14, the tighter the eye or knot 40 will tend to be pulled about the crossed strands 42 captured therein, thus preventing the accidental disassembly of the present line and loops 10 and providing an even tighter and stronger assembly.

The above described line and double loops 10, and its construction, may be formed using virtually any size and material of braided, hollow core rope or the like, whether of natural or synthetic fibers. However, synthetic fiber material is preferred, due to its greater fire resistance, resistance to deterioration due to chemicals, and resistance to breakdown caused by microorganisms. A braided polypropylene rope has been found to provide excellent characteristics for use in the construction of the present line and loops 10. If additional flame or fire resistance is desired, the polypropylene material may be treated with a flame retardant chemical, such as the chemical compound of U.S. Pat. No. 3,738,958 to Henry N. Paul 3rd, incorporated herein by reference. Other suitable chemical treatments providing flame resistance may also be used.

It will be seen that the use of an essentially pure, non-metallic fiber such as polypropylene, also provides an electrically non-conductive hanger due to the electrically insulating properties of such materials, particularly synthetic plastic materials. This provides important safety benefits when the present line and loops 10 are used for the support of electrical equipment, such as electrical cables, etc. in various environments. Accordingly, the various types of snap hooks, D-rings, etc. which may be installed upon the present line and loops 10 during or after its construction, are preferably formed of materials which are not prone to producing sparks when struck by another object, e. g., non-metallic or bronze materials.

While the present line and loops 10 are well suited for use in providing temporary support for innumerable different articles in a vast variety of environments, they are particularly well suited for use in the underground mining industry, due to their flame retardant and electrically non-conductive properties. The present line and loops 10 may be formed using rope having a relatively bright color or colors, in order to provide optimum visibility in the normally relatively dark conditions found in underground mines. Such polypropylene rope material is readily available in such bright colors as yellow, but it has been found that the yellow color may be insufficient in conditions within a mine, as it may become obscured due to lighter colors of dust or other materials.

However, the present line and loops 10 are preferably formed of hollow core braided material having at least one strand of a contrasting bright color, such as a bright international orange, indicated by the heavier contrasting shading of one of the first strands 20 in FIGS. 2 and 3 of the drawings. (It will be understood that such a contrasting strand extends continuously along the entire length of the line, and does not form only a short section, as shown.) It has been found that even in the event that the bright yellow primary coloring of the present line and loops 10 becomes obscured, the bright orange contrasting color of at least one of the multiple braided strands, provides a significant improvement in visibility for the present line and loops 10 and causes them to stand out distinctly against most backgrounds.

In summary, the present flame resistant, electrically non-conductive line with its opposite loops provides a most useful means of temporarily tying off or suspending a variety of different articles in many different industries, such as underground mines, automobile assembly plants, shipyards, etc. The line with its loops provides a significant advance in security over other devices of the related art, which may slip or come apart under heavy loads. The present line and loops may be formed using virtually any suitable diameter of rope, depending upon the strength required for the completed line and loops. Lines and loops formed by the present invention provide weight bearing strength up to the ultimate tensile strength of the rope from which they are formed, without separating or breaking at the connection or splice between the two portions of the rope. The use of electrically non-conductive and flame resistant materials, as well as bright and contrasting colors in different strands of the line or rope, provides hangers which are safe and durable in virtually any environment of use.

It is to be understood that the present invention is not limited to the sole embodiments described above, but encompasses any and all embodiments within the scope of the following claims.

What is claimed is:

1. A line with double spliced loops formed therein for suspending articles therefrom, comprising:

a length of hollow core braided fiber rope having a plurality of first diagonal direction strands alternatingly interwoven with a plurality of second diagonal direction strands, a first end portion, and an opposite second end portion;

each said end portion having a first connecting portion and a second connecting portion mating with said first connecting portion for forming a closed loop;

each said first connecting portion passing diametrically through the corresponding said second connecting portion at a first point thereon to form said closed loop and thereby define an intersecting portion, and thence each said first connecting portion being inserted into said corresponding second connecting portion at a second point thereon and diametrically passed through said first connecting portion at said intersecting portion to form a knot, such that each said first connecting portion passes concentrically through said corresponding second connecting portion to be captured therein;

each said second point being separated from the corresponding said first point by at least one of said first direction strands and at least one of said second direction strands immediately adjacent said at least one of said first direction strands, with said at least one of said first direction stands crossing over said at least one of said second direction strands; and each said closed loop being connected to one another by an intermediate portion.

2. The line according to claim 1, wherein said braided fiber rope is formed of polypropylene fibers treated with a flame retardant material.

3. The line according to claim 1, wherein the majority of said first diagonal direction strands and said second diagonal direction strands are a bright first color, with at least a portion of one of said diagonal direction strands being a bright second color contrasting with said first color.

4. The line according to claim 3, wherein said first color is yellow.

5. The line according to claim 3, wherein said second color is orange.

6. A method of forming a line with double spliced loops formed therein for suspending articles therefrom, comprising the following steps:

(a) providing a length of hollow core braided fiber rope having a plurality of first diagonal direction strands alternatingly interwoven with a plurality of second diagonal direction strands, a first end portion, and an opposite second end portion;

(b) further providing along the rope for each end portion, a first connecting portion and a second connecting portion mating with the first connecting portion for forming a closed loop;

(c) separating adjacent first and second diagonal direction strands at a first point on each second connecting portion;

(d) passing each first connecting portion diametrically through the corresponding second connecting portion at the corresponding first point thereon to form the closed loop and thereby define an intersecting portion;

(e) separating adjacent first and second diagonal direction strands at a second point on each second connecting portion, with each first point being separated from the corresponding second point by at least one of the first direction strands and at least one of the second direction strands immediately adjacent the at least one of the first direction strands and with the at least one of the first direction stands crossing over the at least one of the second direction strands;

(f) inserting each first connecting portion into the corresponding second connecting portion at the second point thereon and diametrically passing through the first connecting portion at the intersecting portion to form a knot, such that each first connecting portion passes concentrically through the second connecting portion, and capturing the corresponding first end therein; and (g) connecting each second connecting portion to one another by an intermediate portion, and forming a first and an opposite second closed loop.

7. The method of forming a line according to claim 6, wherein the step of providing a length of hollow core braided fiber rope includes the steps of:

(a) forming the rope of polypropylene fibers; and (b) treating the rope with a flame retardant material.

8. The method of forming a line according to claim 6, wherein the step of providing a length of hollow core braided fiber rope includes the steps of:

(a) coloring the majority of the first diagonal direction strands and second diagonal direction strands with a bright first color; and (b) coloring at least a portion of one of the diagonal direction strands with a bright second color contrasting with the first color.

9. The method of forming a hanger according to claim 8, wherein the step of coloring the majority of the first diagonal direction strands comprises using yellow as the bright first color.

10. The method of forming a hanger according to claim 8, wherein the step of coloring at least a portion of one of the diagonal direction strands comprises using orange as the bright second color.

* * * * *